Nov. 26, 1935. J. BLOOM 2,022,400
COLLAPSIBLE PORTABLE CARRIAGE
Filed June 24, 1935 2 Sheets-Sheet 1
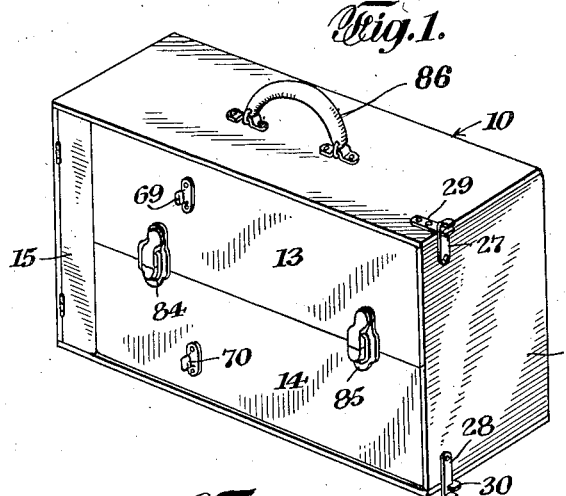
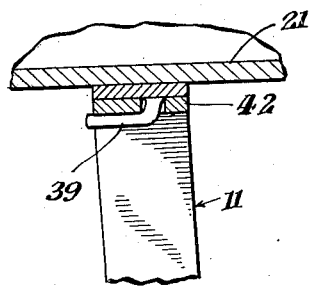
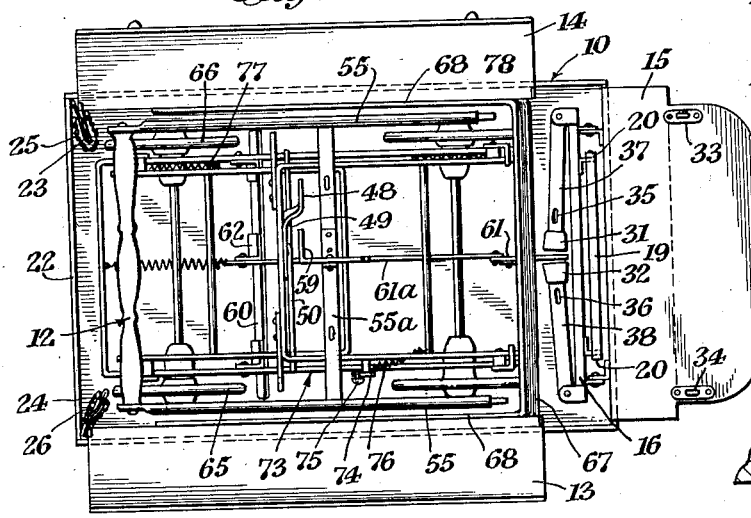
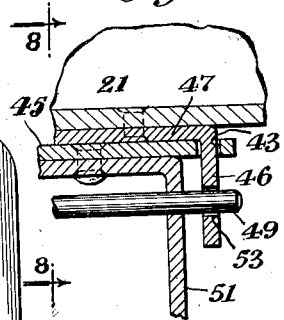
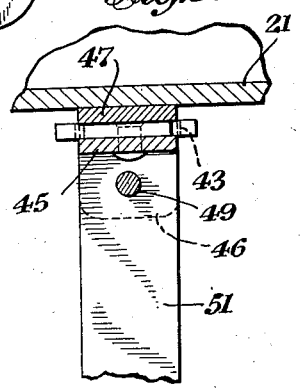
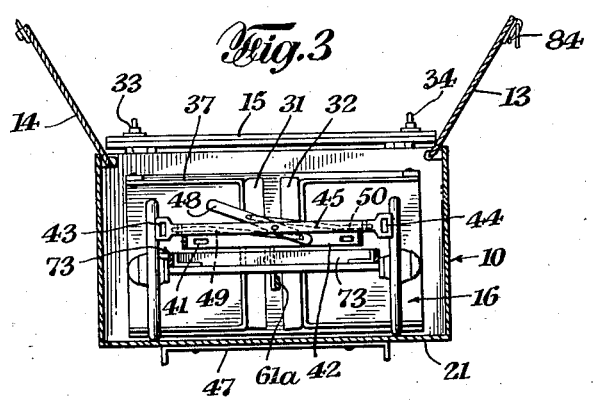
INVENTOR
Jacob Bloom
BY
ATTORNEY Nov. 26, 1935.   J. BLOOM   2,022,400
COLLAPSIBLE PORTABLE CARRIAGE
Filed June 24, 1935   2 Sheets-Sheet 2
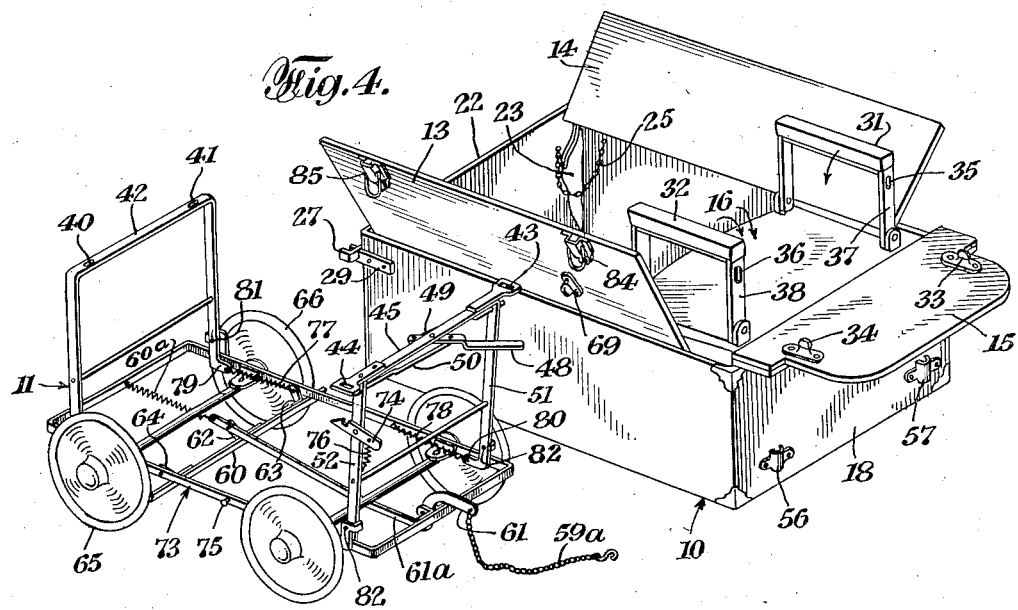
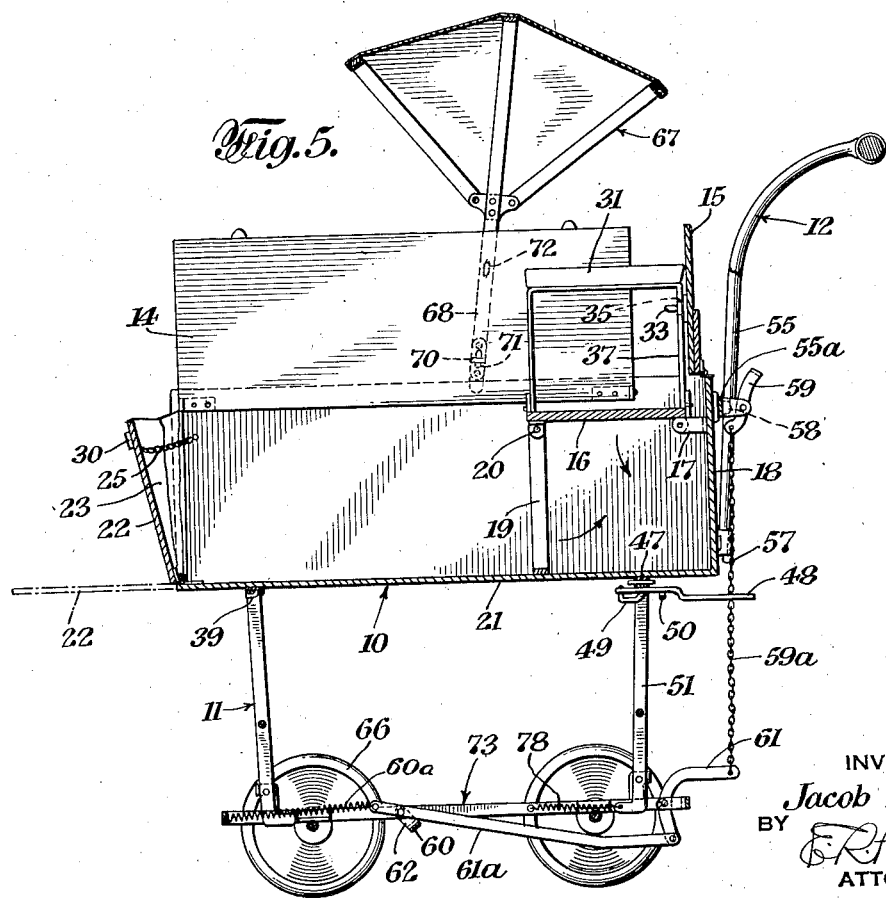
INVENTOR
Jacob Bloom
BY
ATTORNEY Patented Nov. 26, 1935

2,022,400

UNITED STATES PATENT OFFICE 2,022,400

COLLAPSIBLE PORTABLE CARRIAGE

Jacob Bloom, Brooklyn, N. Y.

Application June 24, 1935, Serial No. 28,070

8 Claims. (Cl. 280—37)

This invention relates to a baby carriage collapsible into a handbag or valise so as to render it conveniently portable.

As is apparent, baby carriages are so constructed as to be inherently bulky, cumbersome and space-consuming so that they are not adaptable for convenient transportation in a train, car or other vehicle. Because of the difficulties of carrying the carriage, parents are frequently prevented from making trips with their infants to points remote from their homes, being very often confined to their immediate neighborhoods. It is to overcome this disadvantage characteristic of the ordinary baby carriage that I have conceived this invention, which contemplates the provision of a carriage which can be readily collapsed and folded up into the form of a compact valise, to make the entire device conveniently portable.

It is another object of my invention to provide a vehicle for infants containing adjustable elements for permitting the child to be positioned in either seated or reclining postures, and to enable an awning to be adjustably attached to the device for operative use whether the child is seated or reclining in the carriage.

It is still a further object of this invention to enable the device to be readily and quickly assembled by a person not possessing any special mechanical aptitude or skill.

Other objects, features and advantages will appear from the drawings and description hereinafter given.

Referring to the drawings,

Figure 1 is a perspective of the device constituting my invention shown collapsed into a handbag.

Figure 2 is a plan view of the body of the device with the top side flaps open to show the assembled parts therein.

Figure 3 is a vertical transverse cross section of the structure constituting my invention with the undercarriage in collapsed form within the body thereof.

Figure 4 is a perspective view of the body of the carriage and the wheeled understructure placed alongside thereof.

Figure 5 is a side sectional view of my invention assembled for operative use, showing an awning in place.

Figure 6 is a fragmentary side sectional view of the front portion of the carriage showing the means of attaching the body to the undercarriage.

Figure 7 is a fragmentary transverse section of the rear of the device showing the connecting means between the body and the undercarriage, and Figure 8 is a fragmentary side section taken along line 8—8 of Figure 7.

In the drawings, the body 10 is a separate unit adaptable for operative attachment to the undercarriage or wheeled chassis 11 and the handlebar 12. The body is substantially box-like in shape, containing at the top thereof the two hinged side flaps 13 and 14 and the hinged rear flap 15 which is adapted to serve as a back rest. The seat 16, mounted at the pivotal connection 17 attached to the rear wall 18, is supported by the leg 19 pivotally attached to the seat at connection 20,—said leg being adapted to rest upon the bottom 21 of the body. The front of the body contains the front wall or extensible foot rest 22 which is supported by the flexible side flaps 23 and 24,—this foot rest being adapted to be swung outwardly into a horizontal position where it is further supported by the chains 25 and 26. The said foot rest is held in its vertical closed position by releasable locking members consisting of a pair of pivotally mounted latches 27 and 28 adapted for interlocking engagement with the notched fixed bars 29 and 30, respectively. The seat 16 is further provided with the two arms or side rests 31 and 32 pivotally mounted on the seat at the side edges thereof. When the said side rests are in their upright positions, the back rest 15 can be swung into its vertical position against the back rests and secured thereto by the operative engagement of the rotatable buttons 33 and 34 with the walls of the holes 35 and 36 contained within the uprights 37 and 38 of the side rests.

By referring to Figures 4, 5 and 6 it will be seen that the body 10 can be mounted directly upon the undercarriage or wheeled chassis 11 and secured thereto by operatively inserting the two bent hooks 39 (only one of which is shown) located at the front underside of the body into the two holes 40 and 41 in the transverse member 42 of the front support of the chassis. The rear attachment is effected by inserting into the two slotted apertures 43 and 44, in the transverse member 45 of the rear support, the two downwardly extending perforated ears 46 (only one shown in Figure 7),—said ears being preferably the terminal portions of the transverse bar 47 at the rear underside of the body. Pivotally attached to the center of the said transverse member 45 is the lever 48 to which are pivotally mounted the oppositely positioned bolts 49 and 50 extending through suitable apertures in the lateral rear uprights 51 and 52. These bolts are adapted to be projected in opposite directions through the perforations 53 in said ears upon a manipulation of the lever 48 to lock the undercarriage to the body.

The handlebar 12 is secured to the rear wall 18 of the body by inserting the terminals of the two vertical posts 55 thereof into the receiving ears 56 and 57,—the rotatable buttons 58, of which there are two secured to the rear wall 18 of the body, being operatively engageable with corresponding holes in the transverse bar 55a connecting the two posts 55. The pivotally mounted lever 59 has secured to the end thereof the flexible link or chain 59a which in turn is operatively connected to the transverse brake bar 60 through the links 61, 61a, 62, 63 and 64,—the terminal portions of said brake bar being adaptable for engagement with the rims of the wheels 65 and 66 against the action of spring 60a, upon an upward pull upon the chain 59a effected by a downwardly manipulation of the lever 59.

The awning 67 can be operatively attached to the body by applying the two lateral uprights 68 against the outer sides of the flaps 13 and 14, and operatively engaging the rotatable buttons 69 and 70 with the holes 71 or 72 in the uprights. It will be noted that when the holes 72 are employed for this purpose, the awning will be in a lowered position to render it adaptable for use when the child is in a reclining position, for which the device is adapted as will appear from the description hereinafter given. It will be further observed that this arrangement enables the flaps 13 and 14 to remain vertically disposed inasmuch as they are held against lateral displacement between the said uprights 68 and the arms or side rests 31 and 32.

As is apparent from Figures 4 and 5, the seat 16 is so disposed as to enable the child to remain in a seated position. Should it be desired to place the infant in a reclining position, the arms 31 and 32 are folded inwardly in the direction of the arrows (Figure 4), the leg 19 swung inwardly against the seat, and the seat swung downwardly against the rear wall 18 (Figure 5). A pillow can then be placed against the collapsed seat, and the child's head permitted to recline thereagainst. In this event, it may be necessary to extend the foot rest downwardly to the horizontal position shown in dot-dash lines in Figure 5,—thereby providing additional leg space.

In collapsing the undercarriage, the front support 11 is folded downwardly against the rectangular frame 73, and the rear support consisting of the uprights 51 and 52, the transverse member 45 and attached parts are swung downwardly thereover,—the pivotally mounted locking member 74 being brought into locking engagement with the pin 75. It will be noticed that the spring 76 attached to the upright 52 holds the notch in said member 74 in constant engagement with the shank of the pin 75. The springs 77 and 78, suitably attached to the framework 73, are connected with the terminals 79 and 80 of the front and rear supports respectively,—these supports being pivotally mounted on the frame 73 at 81 and 82 respectively. It is thus apparent that upon a release of the locking member 74 against the action of spring 76, the springs 77 and 78 will urge the said front and rear supports upwardly into their vertical operative positions.

To collapse this device into a handbag, the handlebar 59 is detached from wall 18 and placed within the body. Then the chain 59a is detached from the lever 59, the said front and rear supports folded down as aforesaid, and the undercarriage in this condition inserted into the bottom of the body; and thereafter the awning in its folded position placed thereover. The dimensional design of the parts are such as to enable them all to fit snugly within the body. Thereafter the rear flap 15 is folded inwardly into a horizontal position, the side flaps 13 and 14 closed by means of the locks 84 and 85, and the front wall 22 brought into its closed position and locked in place by means of the latch elements 27, 28, 29 and 30. The entire structure is now contained within the folded body which assumes the shape of a portable handbag that can be conveniently carried by the handle 86.

It is apparent that the structure is such as to enable a person without any special mechanical aptitude to very readily assemble this device for operative use.

It is of course understood that the various embodiments above described and shown in the drawings are illustrative of my invention and not employed by way of limitation, inasmuch as numerous changes and modifications may be made within the scope of the appended claims without departing from the spirit of this invention.

What I claim is:

1. In a collapsible portable carriage, a body containing two side flaps foldable over the top opening to form a closure therefor, a pivotally supported seat at the rear wall of the body and foldable inwardly thereagainst, a back rest at the rear of the seat and foldable inwardly to lie adjacent said side flaps when in their folded positions; a wheeled undercarriage containing a frame for supporting the wheels, front and rear upright supports collapsible downwardly against the frame, and releasable means for holding said supports in their collapsed positions; said undercarriage being adaptable when collapsed to be inserted through said top opening into the body, the said uprights when in their operative positions being adapted to underlie and support said body, means for detachably securing said supports to the body; a handlebar detachably secured to the rear wall of the body and adapted to be inserted through said top opening into the body, and a hand-gripping portion attached to one of the sides of the body.

2. In a collapsible portable carriage, a body containing two side flaps foldable horizontally over the top opening to form a closure therefor, means to releasably hold said flaps in their closed positions, said flaps being adapted for substantially vertical positioning, means to hold the flaps in their vertical positions; a seat pivotally secured to the rear wall of the body and foldable inwardly thereagainst, an arm on either side of the seat and foldable thereagainst, a back rest pivotally mounted on the rear wall of the body and adapted for vertical positioning at the rear of the seat and against said arms, means for releasably securing said back rest to said arms, said back rest being foldable inwardly to underlie said side flaps when in their folded positions; the bottom of said body being adapted for superimposition upon and releasable attachment to a suitable wheeled undercarriage, the rear wall being adapted for detachable engagement with a handlebar, and a side wall thereof having attached thereto hand-gripping means.

3. In a collapsible portable carriage, a body containing two side flaps foldable horizontally over the top opening to form a closure therefor, means to releasably hold said flaps in their closed positions; said flaps being adapted for substantially vertical postioning; a seat pivotally secured to the rear wall of the body and foldable inwardly thereagainst, two arms pivotally mounted at the side edges of the seat and swingably movable into their collapsed positions against the seat, seat-supporting means pivotally mounted at the front edge of the seat and foldable inwardly against the underside thereof, a back rest pivotally mounted on the rear wall of the body and adapted for vertical positioning at the rear of the seat and against said arms, means for releasably securing said back rest to said arms, said back rest being foldable inwardly to underlie said side flaps when in their folded positions; the front wall being pivotally attached to the bottom of the body, detachable means for holding said front wall in its closed vertical position against the body, means for supporting said front wall in a horizontal position substantially coextensive with the bottom of the body; and a wheeled undercarriage detachably secured to said bottom of the body.

4. In a collapsible portable carriage, a body containing two side flaps foldable horizontally over the top opening to form a closure therefor, means to releasably hold said flaps in their closed positions, said flaps being adapted for substantially vertical positioning, a seat pivotally secured to the rear wall of the body and foldable inwardly thereagainst, two normally vertically disposed arms pivotally mounted at the side edges of the seat and collapsible inwardly against the seat; an awning containing two uprights detachably engageable with the outer surfaces of said side flaps to hold them in their vertical positions; a back rest at the rear of the seat and foldable inwardly to underlie said side flaps when in their folded positions; the bottom of said body being adapted for superimposition upon and releasable attachment to a suitable wheeled undercarriage, the rear wall being adapted for detachable engagement with a handlebar, and a side wall thereof having attached thereto hand-gripping means.

5. In a collapsible portable carriage, a wheeled undercarriage containing a horizontally disposed rectangular frame, four wheels suitably mounted thereon, a front and a rear support pivotally secured to the frame, spring means anchored to the frame and operatively engageable with said supports to normally hold them in their upright positions, said supports being swingable downwardly against said frame, releasable locking means for holding the supports in their collapsed positions against the frame; a body adapted for superimposition upon said supports, and means for detachably securing the body to the supports; the said undercarriage in its collapsed condition being adapted for insertion into said body through its top opening.

6. In a collapsible portable carriage, a wheeled undercarriage containing a horizontally disposed rectangular frame, four wheels suitably mounted thereon, a front and a rear support pivotally secured to the frame, spring means anchored to the frame and operatively engageable with said supports to yieldably hold them in their normal upright positions, said supports being swingable downwardly against said frame, releasable locking means for holding the supports in their collapsed positions against the frame; braking means in operative relation to certain of said wheels, spring means to normally keep said braking means inoperative, pivotal means attached to said frame and operatively connected to said braking means for actuating same against the action of said spring means; a body adapted for superimposition upon said supports, means for detachably securing the body to the supports, a handlebar attached to the body, and a lever attached to the handlebar and connected to said pivotal means for operatively actuating same; the said undercarriage in its collapsed condition and the said handlebar being adapted for insertion into said body through its top opening.

7. In a collapsible portable carriage, a wheeled undercarriage containing a horizontally disposed rectangular frame, four wheels suitably mounted thereon, a front and a rear support collapsible downwardly against the frame, releasable means for holding said supports in their collapsed positions against the frame; said supports containing transverse members each having a plurality of apertures therein, a lever pivotally mounted on one of said transverse members, two oppositely positioned bolts extending longitudinally with respect to the transverse member and pivotally secured to said lever at opposite sides of its pivotal mounting so that upon the operative manipulation of the lever the bolts will be projected outwardly in opposite directions; a body adapted to be mounted upon said supports, releasable locking means projecting downwardly from the bottom of said body and adapted to extend through said apertures for operative engagement with said transverse members, and two perforated ears extending downwardly from the bottom of said body and positioned to receive said bolts when projected outwardly by the said manipulation of the lever; the said undercarriage in its collapsed condition being adapted for insertion into said body through its top opening.

8. In a collapsible portable carriage, a wheeled undercarriage containing a horizontally disposed rectangular frame, four wheels suitably mounted thereon, a front and a rear support pivotally secured to the frame, spring means anchored to the frame and operatively engageable with said supports to yieldably hold them in their normal upright positions; said supports being swingable downwardly against said frame, releasable locking means for holding the supports in their collapsed positions against the frame; said supports containing transverse members each having a plurality of apertures therein, a lever pivotally mounted on one of said transverse members, two oppositely positioned bolts extending longitudinally with respect to the transverse member and pivotally secured to said lever at opposite sides of its pivotal mounting so that upon the operative manipulation of the lever the bolts will be projected outwardly in opposite directions; a body adapted to be mounted upon said supports, releasable locking means projecting downwardly from the bottom of said body and adapted to extend through said apertures for operative engagement with said transverse members, and two perforated ears extending downwardly from the bottom of said body and positioned to receive said bolts when projected outwardly by the said manipulation of the lever; the said undercarriage in its collapsed condition being adapted for insertion into said body through its top opening.

JACOB BLOOM.